US012022351B2

United States Patent
Vikberg et al.

(10) Patent No.: US 12,022,351 B2
(45) Date of Patent: *Jun. 25, 2024

(54) MANAGING NON-COORDINATED RADIO ACCESS NETWORKS (71) Applicant: Telefonaktiebolaget LM Ericsson (publ), Stockholm (SE)

(72) Inventors: Jari Vikberg, Järna (SE); Tomas Hedberg, Nacka (SE); Filip Mestanov, Brottby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,033

(22) Filed: Jun. 2, 2023

(65) Prior Publication Data
US 2023/0362775 A1 Nov. 9, 2023

Related U.S. Application Data (63) Continuation of application No. 16/980,490, filed as application No. PCT/SE2018/050261 on Sep. 14, 2020, now Pat. No. 11,770,749.

(51) Int. Cl.
*H04W 36/14* (2009.01)
*H04W 36/00* (2009.01)
*H04W 36/32* (2009.01)

(52) U.S. Cl.
CPC ....... *H04W 36/32* (2013.01); *H04W 36/0072* (2013.01); *H04W 36/14* (2013.01)

(58) Field of Classification Search
CPC ......... H04W 36/0061; H04W 36/0072; H04W 36/14; H04W 36/32; H04W 24/04; H04W 36/0016

See application file for complete search history.

(56) References Cited

U.S. PATENT DOCUMENTS

2014/0148165 A1 5/2014 Serravalle et al.
2014/0301351 A1 10/2014 Gao et al.
(Continued)

FOREIGN PATENT DOCUMENTS

| CN | 107079318 A | 8/2017 |
| EP | 2485505 A1 | 8/2012 |
| WO | 201717159 | 10/2017 |

OTHER PUBLICATIONS

Author Unknown, "Technical Specification Group Core Network and Terminals; Non-Access-Stratum (NAS) protocol for 5G System (5GS); Stage 3 (Release 15)," Technical Specification 24.501, Version 1.0.0, 3GPP Organizational Partners, Mar. 2018, 253 pages.
(Continued)

*Primary Examiner* — Chuck Huynh
*Assistant Examiner* — Dung L Lam
(74) *Attorney, Agent, or Firm* — Withrow & Terranova, PLLC (57) ABSTRACT

Managing a plurality of non-coordinated radio access networks (RANs) connected to the core network is provided by acquiring information indicating that a wireless communication device is connected to a base station in a first of the plurality of RANs, and information indicating a location of the wireless communication device, acquiring information identifying at least a second of the plurality of RANs to which the wireless communication device may connect based on the location of the wireless communication device, and information indicating available frequencies in the second RAN via which frequencies the wireless communication device is allowed to access a network being accessible by the mobility management node, said network being operated by an operator different from those operating the first and second RANs, and delivering the information identifying the second RAN and the information indicating available fre-
(Continued)

quencies in the second RAN to the wireless communication device.

8 Claims, 7 Drawing Sheets

(56) References Cited

U.S. PATENT DOCUMENTS

| | | |
|---|---|---|
| 2014/0349635 A1 | 11/2014 | Lin et al. |
| 2014/0355507 A1 | 12/2014 | Amerga et al. |
| 2016/0037435 A1 | 2/2016 | Yu |
| 2017/0171903 A1 | 6/2017 | Kubota et al. |
| 2020/0028783 A1 | 1/2020 | Jin et al. |

OTHER PUBLICATIONS

Author Unknown, "Technical Specification Group Radio Access Network; Evolved Universal Terrestrial Radio Access Network (E-UTRAN); Stage 2 functional specification of User Equipment (UE) positioning in E-UTRAN (Release 14)," Technical Specification 36.305, Version 14.3.0, 3GPP Organizational Partners, Sep. 2017, 78 pages.

Author Unknown, "Technical Specification Group Radio Access Network; NG Radio Access Network (NG-RAN); Stage 2 functional specification of User Equipment (UE) positioning in NG-RAN (Release 15)," Technical Specification 38.305, Version 1.0.0, 3GPP Organizational Partners, Mar. 2018, 54 pages.

First Office Action for Chinese Patent Application No. 201880091278.0, mailed Jun. 29, 2023, 8 pages.

International Search Report and Written Opinion for International Patent Application No. PCT/SE2018/050261, mailed Nov. 16, 2018, 10 pages.

Non-Final Office Action for U.S. Appl. No. 16/980,490, mailed Jun. 25, 2021, 11 pages.

Final Office Action for U.S. Appl. No. 16/980,490, mailed Oct. 29, 2021, 13 pages.

Advisory Action and Examiner-Initiated Interview Summary for U.S. Appl. No. 16/980,490, mailed Jan. 26, 2022, 6 pages.

Examiner-Initiated Interview Summary for U.S. Appl. No. 16/980,490, mailed Feb. 17, 2022, 2 pages.

Notice of Allowance for U.S. Appl. No. 16/980,490, mailed Mar. 10, 2023, 7 pages.

Non-Final Office Action for U.S. Appl. No. 16/980,490, mailed Apr. 1, 2022, 10 pages.

Final Office Action for U.S. Appl. No. 16/980,490, mailed Jul. 14, 2022, 13 pages.

MANAGING NON-COORDINATED RADIO ACCESS NETWORKS

This application is a continuation of U.S. patent application Ser. No. 16/980,490, filed Sep. 14, 2020, which is a 35 U.S.C. § 371 national phase filing of International Application No. PCT/SE2018/050261, filed Mar. 16, 2018, now published as International Publication No. WO 2019/177506, the disclosures of which are incorporated herein by reference in their entireties.

TECHNICAL FIELD

The invention relates to methods and devices for managing a plurality of non-coordinated radio access networks.

BACKGROUND

Today's utilities sector is undergoing a digital transformation driven by advancement in power generation technologies, which enables an increasing portion of energy supply to come from decentralized local power production sources, such as photovoltaics, wind and water turbines, energy harvesters, etc.

Simultaneously, the electrical grid itself is evolving to cater for a paradigm shift from centralized to decentralized power generation and distribution. The utilities sector is now turning to communication technologies, which will help transforming their business and enable new use cases.

In large parts of the high-voltage transmission networks, the utilities sector is using fibre technologies which provide high-speed, reliable and resilient communication. However, one down-side of deploying fibre to all locations that need to be connected is its cost: it is simply not economical to deploy fibre everywhere.

In search for an alternative communication technology that can be used to address the use cases of interest at an economically feasible price point, the utilities sector has developed an interest in the latest generation cellular technologies.

While today, cellular technologies are mainly owned and managed by mobile network operators (MNOs), the future use of those technologies expands beyond that single ownership model. One reason for this is service level agreements (SLAs) usually offered by the MNO to their customers; the SLAs of today are mainly derived based on the assumption that the customer will use the network for non-critical services, such as data, video, voice-calls. However, some of the use cases for which the utilities sector is planning to use the communication network are much more demanding, with far stricter requirements on reliability, availability, latency, etc.

Since the MNOs have not built their network with the support for critical use cases in mind, many of them are usually reluctant to contractually commit to supporting such use cases. Therefore, the utilities sector is exploring alternative solutions, or alternative network ownership models, which better address its needs.

Such needs include (a) ubiquitous, always-on telecom services, which ensure high reliability, high availability and low latency of the network to support critical services and which guarantees full coverage of the electrical grid, (b) control over the owned or rented service, which gives end-to-end autonomy and visibility and which promotes strict control and security mechanisms to manage the critical infrastructure, and (c) risk management, which enables control of commercial and operational risk and promotes risk mitigation in case of technical failures.

Hence, a problem with today's telecommunication structures is that the structures do no meet these needs and thus cannot be used by the utilities sector.

SUMMARY

An object of the invention is to solve, or at least mitigate, this problem and thus to provide a method of a mobility management node in a core network of managing a plurality of non-coordinated radio access networks (RANs).

This object is attained in a first aspect of the invention by a method of a mobility management node in a core network of managing a plurality of non-coordinated RANs connected to the core network. The method comprises acquiring information indicating that a wireless communication device is connected to a base station in a first of the plurality of RANs, and information indicating a location of the wireless communication device, acquiring information identifying at least a second of the plurality of RANs to which the wireless communication device may connect based on the location of the wireless communication device, and information indicating available frequencies in the second RAN via which frequencies the wireless communication device is allowed to access a network being accessible by the mobility management node, said the mobility management node being operated by an operator different from those operating the first and second RANs, and delivering the information identifying the second RAN and the information indicating available frequencies in the second RAN to the wireless communication device.

This object is attained in a second aspect of the invention by a mobility management node in a core network configured to manage a plurality of non-coordinated RANs connected to the core network, said mobility management node comprising a processing unit and a memory, said memory containing instructions executable by said processing unit, whereby the mobility management node is operative to acquire information indicating that a wireless communication device is connected to a base station in a first of the plurality of RANs, and information indicating a location of the wireless communication device, acquire information identifying at least a second of the plurality of RANs to which the wireless communication device may connect based on the location of the wireless communication device, and information indicating available frequencies in the second RAN via which frequencies the wireless communication device is allowed to access a network being accessible by the mobility management node, said the mobility management node being operated by an operator different from those operating the first and second RANs, and deliver the information identifying the second RAN and the information indicating available frequencies in the second RAN to the wireless communication device.

This object is attained in a third aspect of the invention by a method of a wireless communication device of acquiring access information relating to a plurality of non-coordinated RANs in a wireless communication network. The method comprises connecting to a mobility management node via a base station in a first of the plurality of RANs, and receiving information identifying at least a second of the plurality of RANs to which the wireless communication device may connect based on a location of the wireless communication device, and information indicating available frequencies in the second RAN via which frequencies the wireless communication device is allowed to access a network being accessible by the mobility management node, said the mobility management node being operated by an operator different from those operating the first and second RANs.

This object is attained in a fourth aspect of the invention by a wireless communication device configured to acquire access information relating to a plurality of non-coordinated RANs in a wireless communication network, the wireless communication device comprising a processing unit and a memory said memory containing instructions executable by said processing unit, whereby the wireless communication device is operative to connect to a mobility management node via a base station in a first of the plurality of RANs, and receive information identifying at least a second of the plurality of RANs to which the wireless communication device may connect based on a location of the wireless communication device, and information indicating available frequencies in the second RAN via which frequencies the wireless communication device is allowed to access a network being accessible by the mobility management node, said the mobility management node being operated by an operator different from those operating the first and second RANs.

In an exemplifying context, a utilities party such as a power distributor or Distributed System Operator (DSO) operates a core network and interfaces with RANs of one or more mobile network operators (MNOs) via a mobility management node for managing connection of a wireless communication device having access to a DSO network accessible by the mobility management node.

Hence, the mobility management node connects to at least a base station of a first of the plurality of RANs and to a base station of a second of the plurality of RANs.

A first MNO operating the first RAN and a second MNO operating the second RAN both broadcasts a Public Land Mobile Network (PLMN) identifier of the utilities party for connecting to the DSO network operated by the utilities party, while each MNO also broadcasts its own PLMN identifier. The RAN cells of each MNO use the radio spectrum that belongs to them: for example a first and a second frequency used in the first RAN, and a third and a fourth frequency used in the second RAN. The PLMN service of the DSO network operated by the utilities party is thus available in all four frequencies used by the RANs.

The wireless communication device registered for service in the DSO network may connect to the mobility management node operated by the DSO/utilities party via the base station of the first RAN, wherein the mobility management node becomes aware that the wireless communication device is connected to the base station of the first RAN, and of information indicating a location of the wireless communication device.

Thereafter, the mobility management node acquires information, for instance from a local or remote storage, identifying the second RAN and information indicating available frequencies in the second RAN via which the wireless communication device is allowed to access the DSO network operated by the utilities party.

The mobility management node then delivers the information identifying the second RAN and the available frequencies to the wireless communication device.

Advantageously, this enables the wireless communication device to move between all frequencies on which the DSO PLMN service of the DSO network is available via the first and the second RAN as indicated by means of the provided PLMN ID of the utilities party. Consequently, fast reconnection is enabled upon a failure in the currently serving MNO RAN.

In an embodiment, the acquiring of the information indicating that the wireless communication device is connected to a base station in the first RAN comprises receiving, from the base station of the first RAN, a RAN identifier from which the location of the wireless communication device is determined, for example an Evolved Universal Terrestrial Radio Access Network Cell Global Identity (E-CGI) or a 5G cell identity.

In another embodiment, the acquiring of the information indicating that the wireless communication device is connected to a base station in the first RAN further comprises receiving, from the base station of the first RAN, location data of the wireless communication device. In an example, this data may comprise geographical coordinates of the wireless communication device.

In a further embodiment, the acquiring of the information identifying at least a second of the plurality of RANs to which the wireless communication device may connect comprises sending a request for the information to an external information providing device, the request comprising the location information of the wireless communication device and an identifier of the first RAN, and receiving, in response to the request, the information identifying the at least a second of the plurality of RANs to which the wireless communication device may connect based on the location of the wireless communication device, and the information indicating available frequencies in the second RAN.

In still an embodiment, the information identifying the second RAN and the available frequencies is received at the wireless communication device, via the base station of the first RAN, from the mobility management node in a Non-Access Stratum (NAS) message or a Radio Resource Control (RRC) message.

In still an embodiment, the wireless communication device detects that the connection to the base station of the first RAN has reached a Quality of Service (QoS) below a threshold value or is discontinued, and thus connects to the mobility management node via a base station in the second of the plurality of RANs using the information identifying the second RAN and the information indicating available frequencies in the second RAN via which frequencies the wireless communication device is allowed to access the network accessible by the mobility management node.

In a fifth aspect of the invention, a computer program is provided comprising computer-executable instructions for causing a mobility management node to perform steps recited in the method of the first aspect when the computer-executable instructions are executed on a processing unit included in the mobility management node.

In a sixth aspect of the invention, a computer program product is provided comprising a computer readable medium, the computer readable medium having the computer program of the fifth aspect embodied thereon.

In a seventh aspect of the invention, a computer program is provided comprising computer-executable instructions for causing a wireless communication device to perform steps recited in the method of the third aspect when the computer-executable instructions are executed on a processing unit included in the wireless communication device.

In an eighth aspect of the invention, a computer program product is provided comprising a computer readable medium, the computer readable medium having the computer program of the seventh aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
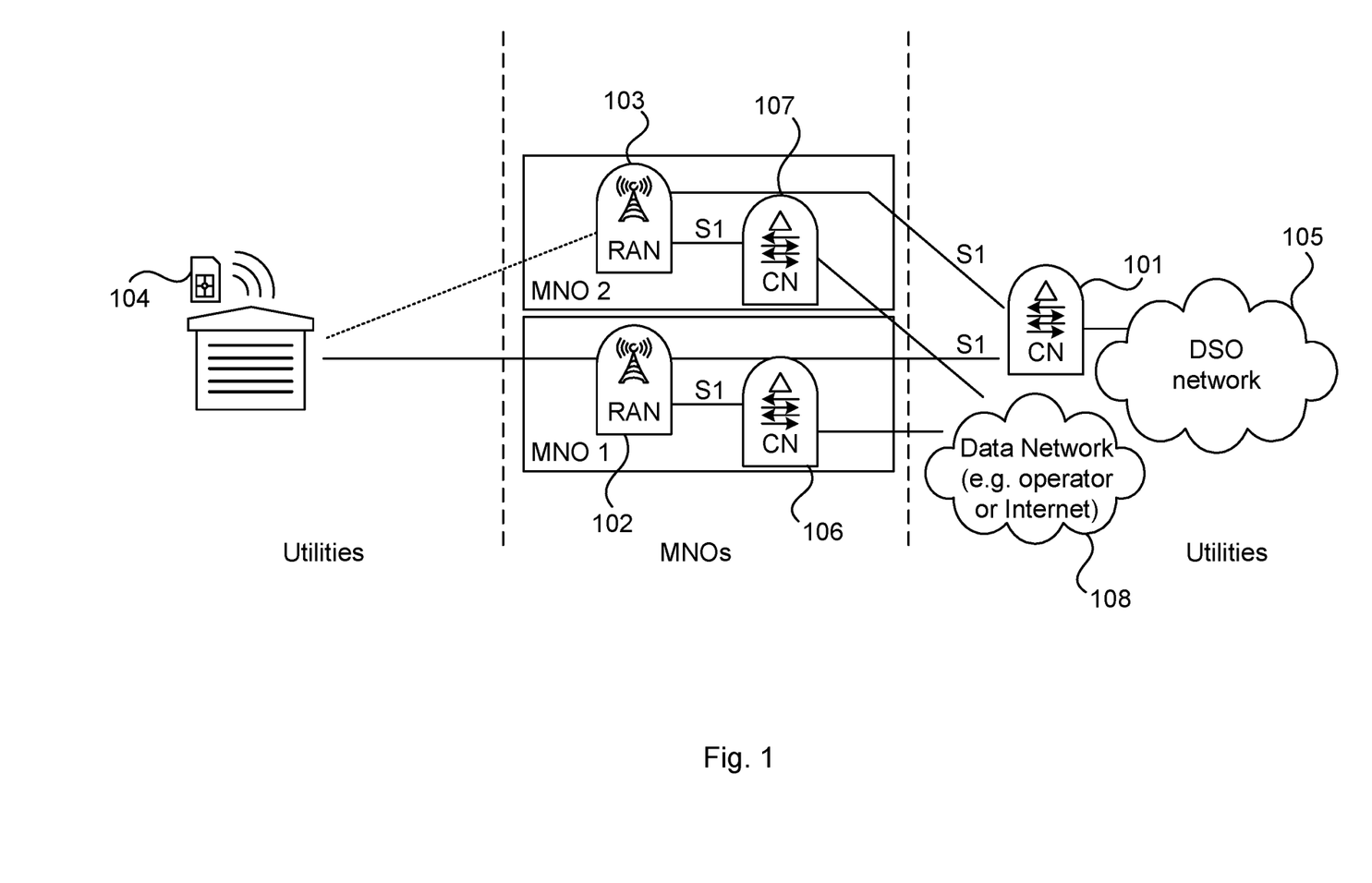
FIG. 1 shows a simplified prior art communication network in which the present invention can be implemented.

FIG. 1 shows a simplified prior art communication network in which the present invention can be implemented.

In this case, a utilities party, being for instance a power distributor, operates a core network 101 and integrates with radio access networks (RANs) of one or more mobile network operators (MNOs) via an S1 reference point, in this example with a first RAN 102 of MNO1a and a second RAN 103 of MNO2. It should be noted that the utilities context is exemplifying only, and other scenarios are envisaged, such as for instance an Internet of Things (IoT) context The core network 101 of the utilities party is configured to connect any utilities communication device 104—referred to in the following as a User Equipment (UE)—embodied in the form of e.g. a modem, a smart phone, a tablet, a smart watch, a television set, etc., of for instance in the form of an IoT device such as a thermometer, a power sensor, an actuator, etc., to a so called Distribution System Operator (DSO) network 105 operated by the utilities party (the utilities party and the DSO are thus the same), while the MNOs also have their own core networks 106, 107 for connecting other UEs to a data network 108 such as the Internet or a data network 108 operated by the respective MNO. Generally, the utilities UE 104 does not have credentials to access the core networks of the MNOs.

FIG. 1 illustrates a scenario where the utilities party is integrating with two different MNOs, while in a generic case, the utilities can integrate with a great number of MNOs. This network structure is typically fully standard-compliant and commonly referred to as Multi-Operator Core Network (MOCN) and as can be concluded from FIG. 1, one of the core network operators is the utilities party itself. The utilities party typically owns and operates core network 101, but buys radio connectivity from one or more MNOs, e.g. MNO1 and MNO2. The expected case is that there will be several MNOs available, since that will increase the reliability and resiliency. However, the number of available MNOs in each individual DSO UE (i.e. utilities UE) location may vary.

In the normal MOCN case, a single RAN is shared while the core networks are separate. This single RAN is typically a conventional, coordinated RAN. In the network structure shown in FIG. 1, the core network 101 of the utilities party is connected to multiple RANs 102, 103 of different MNOs which hence may be referred to as MOCN with multiple RANs.

The different RANs 102, 103 are managed and controlled by different MNOs—i.e. MNO1 and MNO2, respectively—and have no relation to each other in terms of coordination or configuration. Therefore, an even more precise descriptive term for this structure is MOCN with multiple non-coordinated RANs. In other words, the exemplified first RAN 102 and second RAN 103 are both non-coordinated, i.e. the first RAN 102 does not have knowledge about the second RAN 103 and vice versa.

Figure 2:
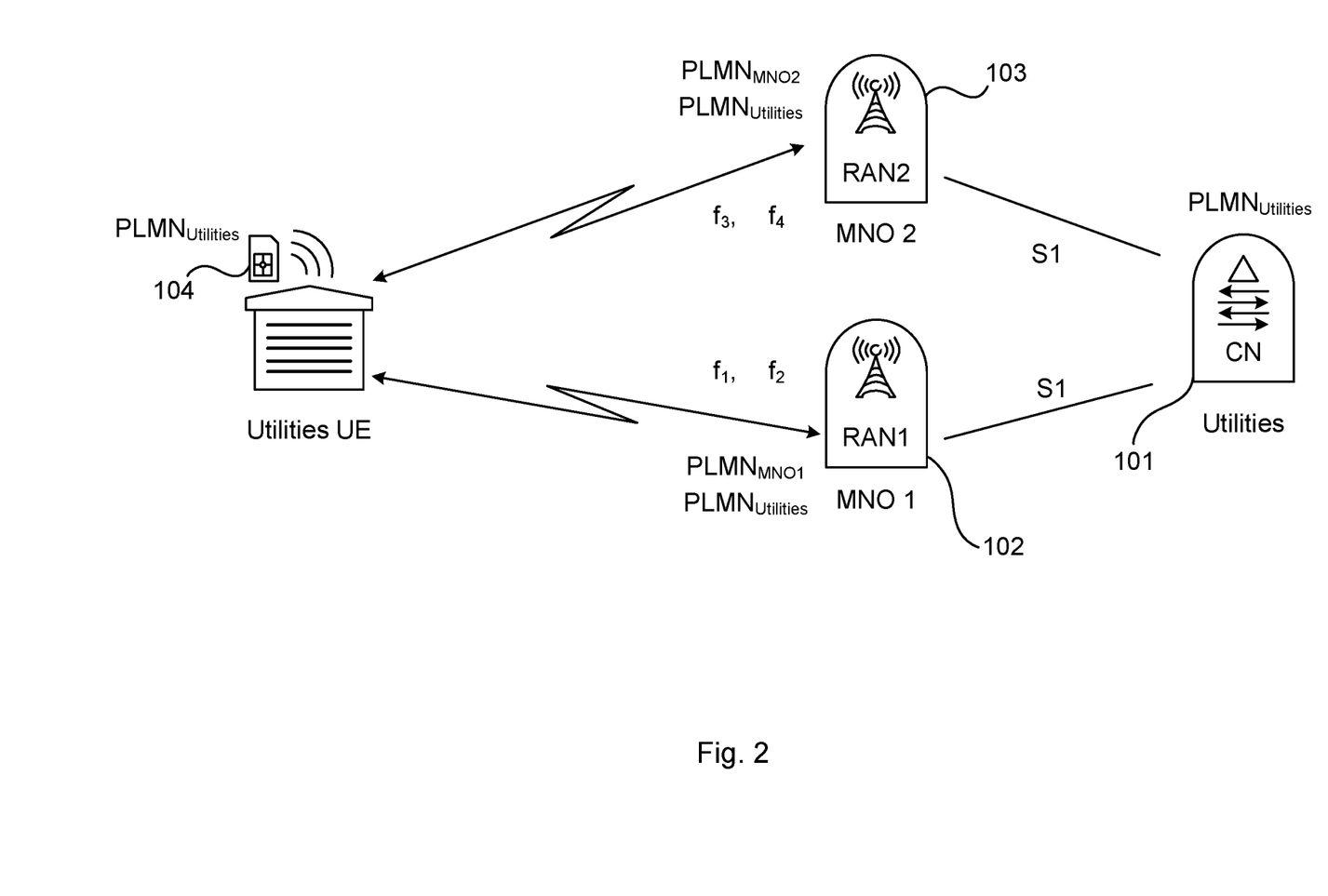
FIG. 2 shows a simplified prior art communication network in which the present invention can be implemented.

FIG. 2 illustrates that the shared RANs 102, 103 typically indicate multiple Public Land Mobile Network (PLMN) identifiers (PLMN-IDs) to the utilities UE 104. For example, the RAN 102 of MNO1 is shared by the utilities party and MNO1, while the RAN 103 of MNO2 is shared by the utilities party and MNO2. The different RANs can provide either fully or partly overlapping coverage. Further, in practice each RAN comprises a plurality of base stations providing coverage in the RAN.

Hence, in an MOCN, both MNO1 and MNO2 broadcast the PLMN identifier of the utilities party for connecting to the DSO network operated by the utilities party, which is referred to as $PLMN_U$ or $PLMN_{Utilities}$, while each MNO also broadcasts its own PLMN identifier, referred to as $PLMN_{MNO1}$ and $PLMN_{MNO2}$, respectively. The RAN cells of each MNO use the radio spectrum that belongs to them: for example, f1 and f2 for MNO1, and f3 and f4 for MNO2. The DSO PLMN service of the utilities party, i.e. $PLMN_U$ or $PLMN_{Utilities}$, is thus available at all frequencies from f1 to f4.

A problem with MOCN with multiple non-coordinated RANs as illustrated in FIGS. 1 and 2 is that the DSO PLMN service of the utilities party is available in two different RANs (the first RAN 102 and the second RAN 103) that are unaware of each other.

For instance, for idle mode mobility, it would be desirable that the utilities UE 104 can move between all frequencies f1-f4 on which the DSO PLMN service of the DSO network 105 is available. However, this is not possible in the prior art MOCN; if the utilities UE 104 for instance is connected to RAN1 of MNO1, network assistance for idle mode mobility will only consider f1 and f2.

Another important issue relates to the high-reliability and high-availability connectivity requirements of the DSO network 105 operated by the utilities party. Assuming for instance that the utilities UE 104 is connected to the first RAN 102 operated by MNO1 and there is a failure in the first RAN 102; if so the UE 104 should be able to move very quickly to the second RAN 103 operated by MNO2 while remaining connected to the DSO network 105. However, the utilities UE 104 is not aware of the second RAN 103 when being connected to the first RAN 102.

The invention tackles these problems by providing a solution where the utilities core network 101 of the utilities party is the common point where all non-coordinated RANs 102, 103 are connected to. The utilities core network 101 provides guidance to the utilities UE 104 about the non-coordinated RANs, and in particular about the non-coordinated RAN(s) which the UE 104 is not currently connected to. This guidance can be used by the UE 104 for idle mode mobility.

Figure 3:
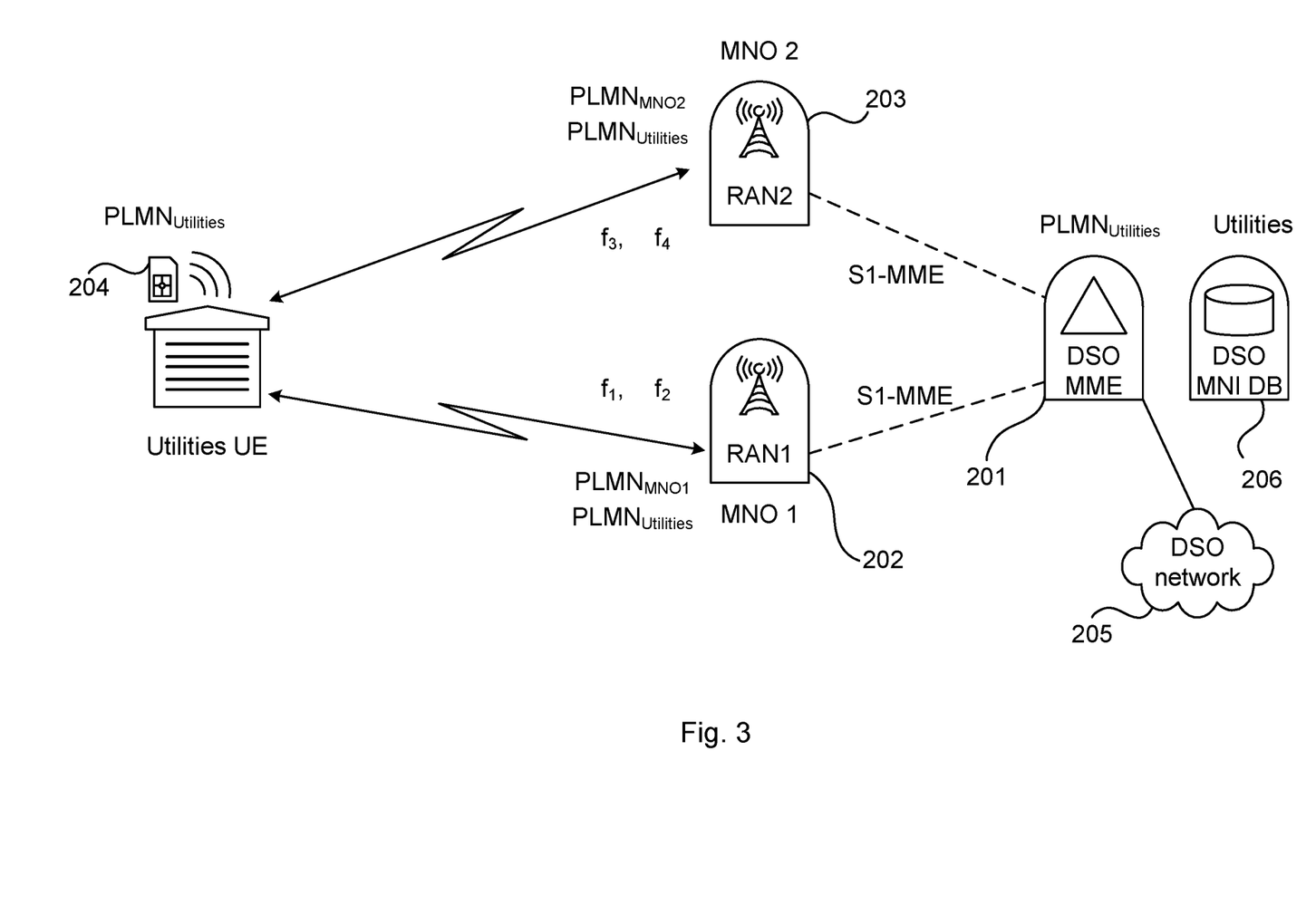
FIG. 3 illustrates a communication network in which a mobility management node is implemented according to an embodiment.

FIG. 3 illustrates a communication network in which a mobility management node is implemented according to an embodiment.

Again, a utilities party (such as a power distributor or DSO) operates a core network and interfaces with radio access networks RANs of one or more mobile network operators MNO1, MNO2 via a mobility management node 201, which in the following is referred as a DSO Mobility Management Entity (MME), for managing connection of the utilities UE 204 to the DSO network 205.

Hence, the DSO MME 201 connects via an S1-MME reference point to a first base station 202, referred to as an Evolved NodeB (eNB), operating a first RAN and to a second base station 203 operating a second RAN. Again, each RAN will in practice typically comprise multiple base stations.

As previously discussed, both MNO1 and MNO2 broadcasts the PLMN identifier of the utilities party—$PLMN_U$—for connecting to the DSO network 205 operated by the utilities party, while each MNO also broadcasts its own PLMN identifier referred to as $PLMN_{MNO1}$ and $PLMN_{MNO2}$, respectively. The RAN cells of each MNO use the radio spectrum that belongs to them: for example, f1 and f2 used by the first eNB 202 for MNO1, and f3 and f4 used by the second eNB 203 for MNO2. The DSO PLMN service of the DSO network 205 of the utilities party is thus available in all frequencies from f1 to f4.

As further shown in FIG. 3, a DSO MNO database (DB) 206 may be connected to the DSO MME 201 for storing appropriate data as regards the RANs of MNO1 and MNO2, such as for instance the frequencies available for accessing the DSO MME 201 identified by $PLMN_U$. The DSO MNO DB 206 may be located remote from the DSO MME 201. However, it is also envisaged that any data stored at the DSO MNO DB 206 alternatively is stored locally at the DSO MME 201.

Figure 4:
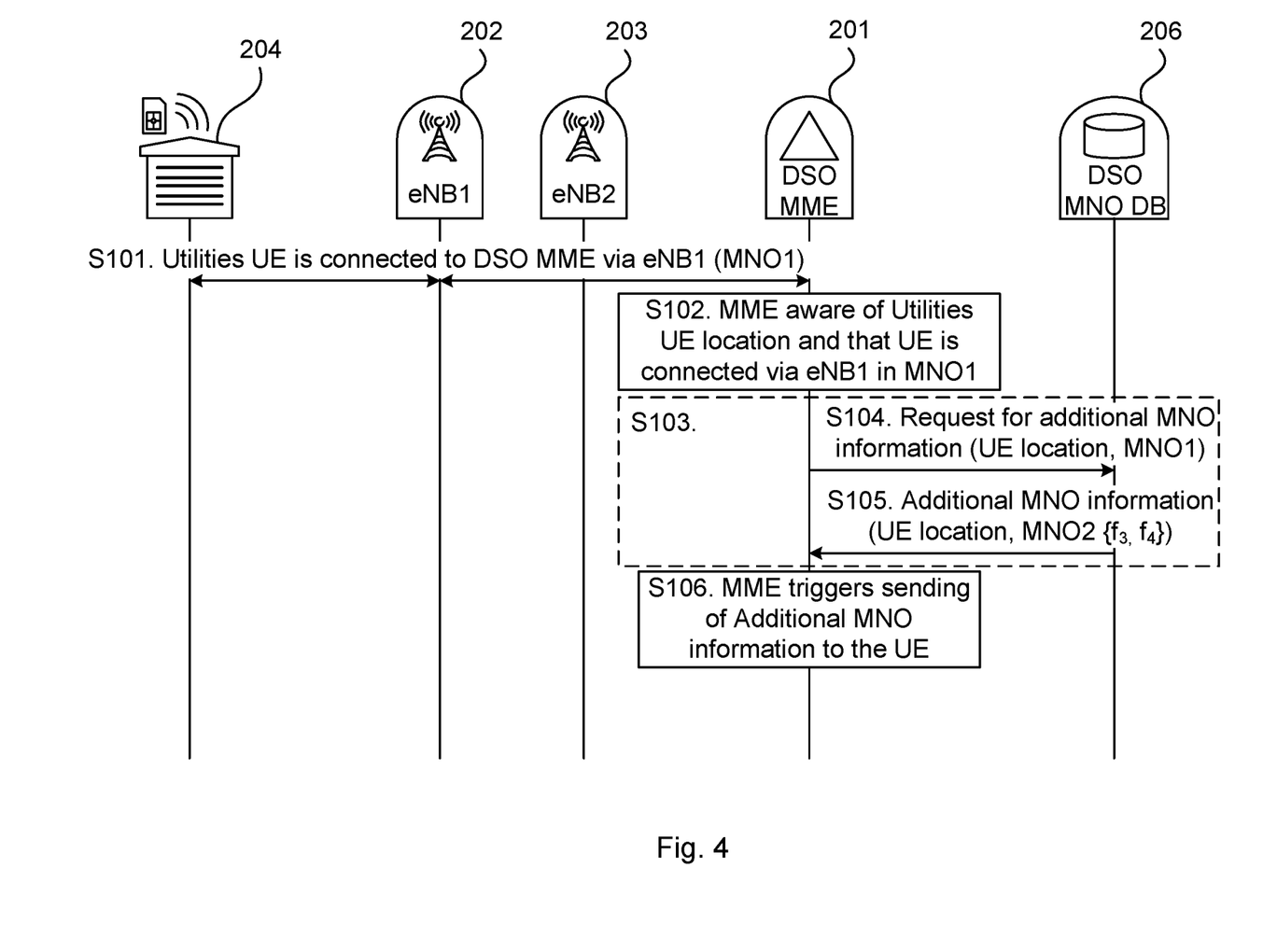
FIG. 4 shows a signalling diagram illustrating an embodiment of a mobility management node managing two non-coordinated RANs operated by different MNOs.

FIG. 4 shows a signalling diagram illustrating an embodiment of the mobility management node 201—being arranged in a core network operated by a utilities party—managing two non-coordinated RANs operated by different MNOs.

In this exemplifying embodiment, the mobility management node 201 (i.e. the DSO MME) turns to DSO MNO DB 206 for acquiring necessary RAN information. However, as has been discussed, this information may alternatively be stored locally in the DSO MME 201, in which case the DSO MNO DB 206 would not be utilized.

In step S101, the utilities UE 204 connects to the DSO MME 201 via the first eNB 202 providing coverage in the first RAN, and to the DSO network 205 managed by the DSO MME 201.

In step S102, the DSO MME 201 acquires information indicating that the utilities UE 204 is connected to the first eNB 202 of the first RAN, and information indicating a location of the utilities UE 204.

Hence, in step S102, the DSO MME 201 becomes aware that the utilities UE 204 is connected to the first eNB 202 operated by MNO1, and of the location of the utilities UE 204.

In an embodiment, the DSO MME 201 receives a so called Evolved Universal Terrestrial Radio Access Network Cell Global Identity (E-CGI) of the first eNB 202 in order to deduce the location of the utilities UE 204.

In an alternative embodiment, the utilities UE 204 is equipped with a Global Positioning System (GPS) receiver and transmits location data to the DSO MME 201 via the first eNB 202 using for instance Non-Access Stratum (NAS) signalling.

The MME 201 can generally use any of current or future UE positioning reports to deduce (approximate) UE positions. Examples are given in 3GPP TS 36.305 and related specifications for LTE. Further, an embodiment using direct MME-UE signalling (described e.g. in TS 24.501) is not precluded.

Thereafter, in step S103, the DSO MME 201 acquires information identifying the second RAN to which the utilities UE 204 may connect based on its location. As previously discussed, the second eNB 203 operated by MNO2 provides coverage in the second RAN. Further in step S103, the DSO MME 201 acquires information indicating available frequencies f3, f4 in the second RAN via which frequencies the utilities UE 204 is allowed to access the DSO network 205 operated by the utilities party, and thus being accessible by the DSO MME 201. It should be noted that the frequencies f3, f4 may only constitute a subset of the total number of frequencies provided by the second eNB 203. Hence, for some of the frequencies provided by the second eNB 203, the DSO network 205 may not be accessed.

In this particular exemplifying embodiment, the DSO MME 201 acquires the information from the DSO MNO DB 206.

There are different ways to configure the DSO MNO DB 206. In one example the information is retrieved from the MNOs. In another example, the utilities UE 204 reports this information to the DSO MNO DB 206.

Hence, in the embodiment of FIG. 4, step S103 of acquiring information is performed by the DSO MME 201 transmitting a request in step S104 to the DSO MNO DB 206 for information identifying the second RAN (e.g. $PLMN_{MNO2}$) to which the utilities UE 204 is capable of connecting based on its location, as well as for the available frequencies f3, f4 of the second eNB 203 via which the utilities UE 204 also can connect to the DSO network 205. The request may further indicate to which MNO RAN (i.e. the first RAN) the utilities UE 204 currently is connected.

The DSO MNO DB 206 responds in step S105 by providing information identifying the second RAN and the available frequencies f3, f4.

Thereafter, in step S106, the DSO MME 201 delivers or triggers delivery of the information identifying the second RAN and the information indicating available frequencies f3, f4 in the second RAN via which the DSO network 205 further may be accessed by the utilities UE 204. This is shown in more detail in the below with reference to FIGS. 5A and 5B.

Advantageously, the embodiment described with reference to FIG. 4 enables the utilities UE 204 to move between all frequencies f1-f4 on which the DSO PLMN service of the DSO network 205 is available as indicated by means of the provided $PLMN_U$. Consequently, fast re-connection is enabled upon a failure in the currently serving MNO RAN, which implies that the utilities UE 204 will perform a cell reselection, since the failure is not foreseen.

Figure 5A:
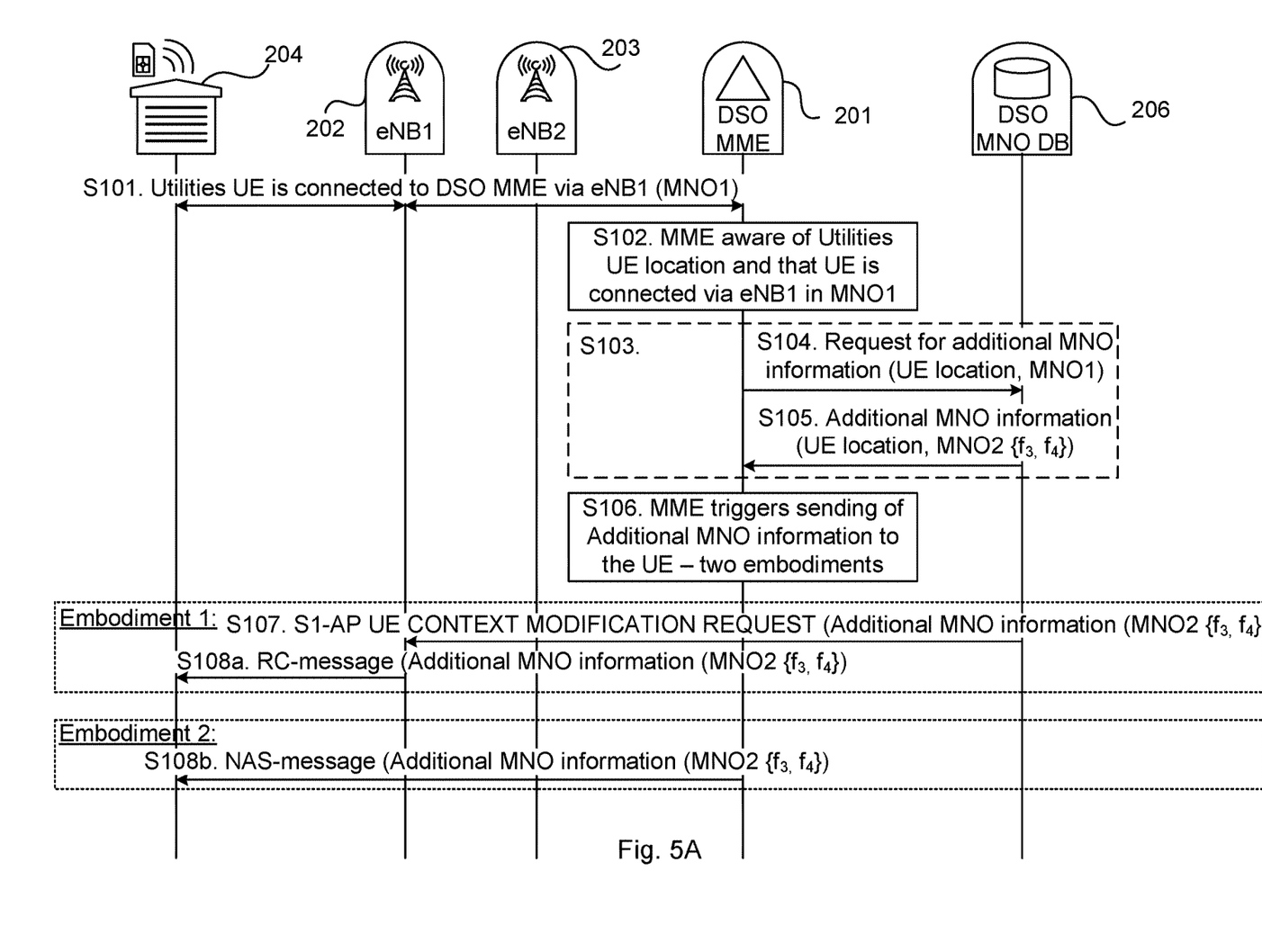
FIGS. 5A and 5B show a signalling diagram illustrating further embodiments of the invention.
Figure 5B:
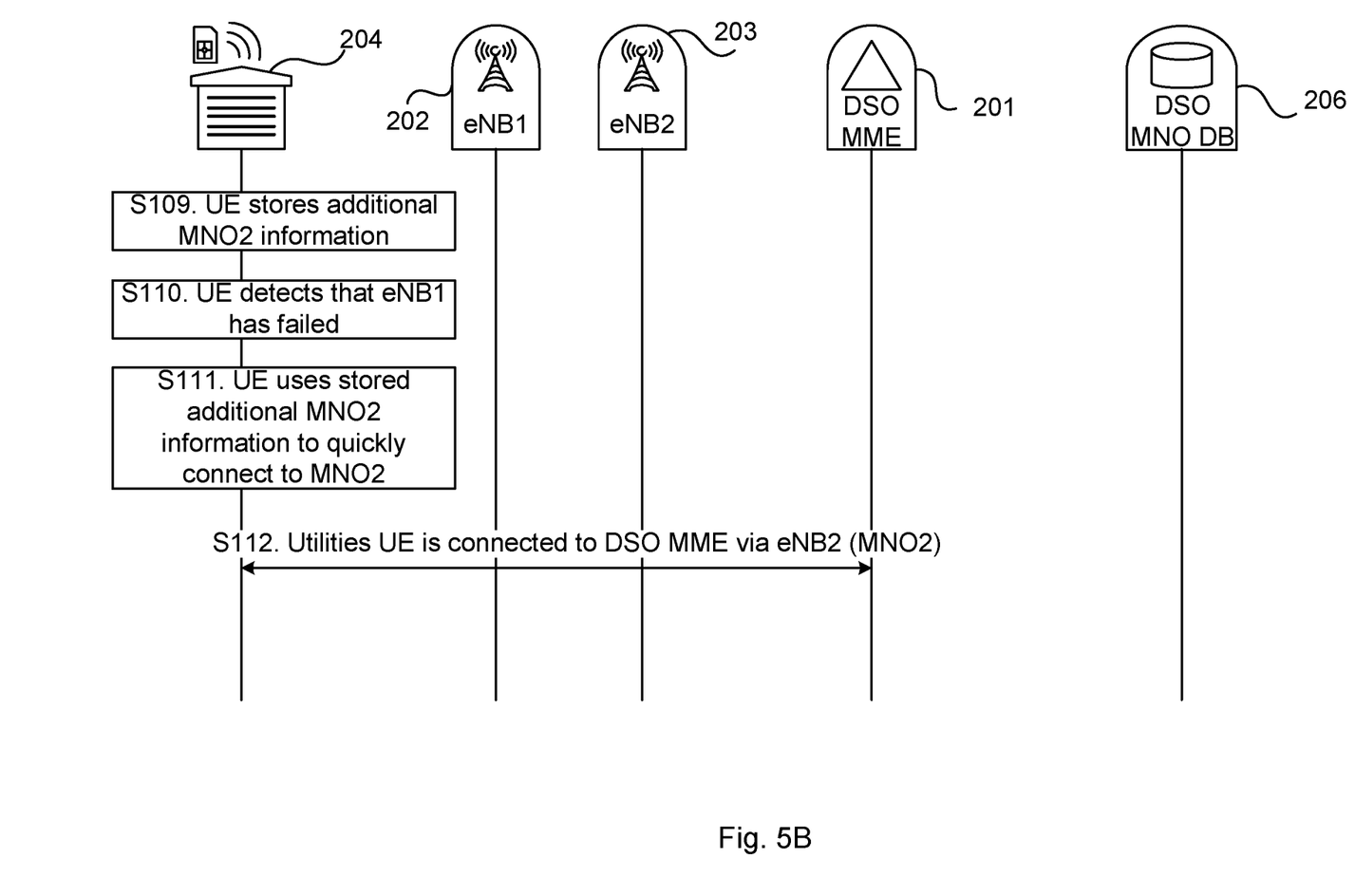

FIGS. 5A and 5B show a signalling diagram illustrating further embodiments of the invention. The signalling diagram of FIGS. 5A and 5B is a continuation of that shown in FIG. 4.

Now, the information identifying the second RAN (e.g. $PLMN_{MNO2}$) and the information indicating available frequencies f3, f4 in the second RAN via which the DSO network 205 further may be accessed by the utilities UE 204 may be delivered to the utilities UE 204 in accordance with different embodiments.

In a first embodiment, the DSO MME 201 transmits $PLMN_{MNO2}$ and f3, f4 to the utilities UE 204 via the first eNB 202 in step S107 for forwarding to the utilities UE 204 in step S108a.

In practice, this can be performed using any S1-AP ("Application Protocol") procedure for UE-associated signalling and one such example is the S1-AP UE CONTEXT MODIFICATION REQUEST message and related procedure.

The forwarding in step S108a is typically performed done using a Radio Resource control (RRC) message and in one example the MNO2 information is indicated as a dedicated priority to the UE. The information is also flagged indicating that the information is of a lower priority compared to other dedicated priorities received from the first eNB 202.

In a second embodiment, the DSO MME 201 transmits $PLMN_{MNO2}$ and f3, f4 to the utilities UE 204 via the first eNB 202 in step S108b for forwarding to the utilities UE 204 using a NAS message.

Upon receiving the $PLMN_{MNO2}$ and f3, f4, the utilities UE 204 stores this information in step S109 for subsequent use.

Now, assuming for instance that Quality of Service (QoS) of the connection established between the utilities UE 204 and the first eNB 202 deteriorates and falls under an acceptable QoS threshold (e.g., due to the utilities UE 204 moving out of coverage of the RAN provided by the first eNB 202), or even that the connection is discontinued, as detected in step S110, the utilities UE 204 uses the stored information, i.e. $PLMN_{MNO2}$ and f3, f4, to connect to the second eNB 203 in step S111.

Further, the utilities UE 204 uses any one of the available frequencies f3, f4 to connect to the DSO MME 201 and the network 205 of the utilities party in step S114.

Embodiments have been described hereinabove in the context of a fourth generation (4G) communication system, e.g. a Long Term Evolution (LTE) system with an Evolved Packet Core (EPC) network and corresponding functions. The embodiments can also be applied to other mobile systems, for example to a fifth generation (5G) networks including both LTE and New Radio (NR) radio accesses. In a 5G setting, the DSO MME 201 may receive an E-CGI or a 5G cell identity of the first eNB 202 in order to deduce the location of the utilities UE 204. The DSO MME 201 can generally use any of current or future UE positioning reports to deduce (approximate) UE positions. Examples are given in TS 38.305 and related specifications (currently not existing but only planned) for 5G.

In such a context, the DSO MME 201 would be replaced with a DSO Access and Mobility Management Function (AMF). Further, the RANs may comprise eNBs and/or what is commonly referred as next generation NBs (gNBs). Thus, instead of the S1-MME reference point of FIG. 3, the DSO AMF would be connected to any base station via NG-C/N2 reference point, where NG-C is the term used by 3rd Generation Partnership Project (3GPP) RAN working groups while N2 is the term used by 3GPP Service and System Aspects Working Group 2 (SA2).

Figure 6:
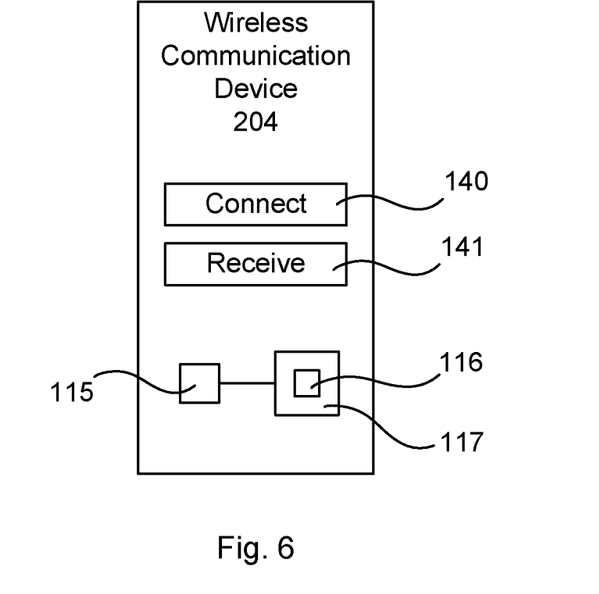
FIG. 6 illustrates a wireless communication device according to an embodiment.

FIG. 6 illustrates a wireless communication device 204 according to an embodiment. The steps of the method performed by the wireless communication device 204 of acquiring access information relating to a plurality of non-coordinated RANs in a wireless communication network according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the wireless communication device 204 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

The wireless communication device 204 comprises connecting means 140 adapted to connect to a mobility management node via a base station in a first of the plurality of RANs, and receiving means 141 adapted to receive information identifying at least a second of the plurality of RANs to which the wireless communication device 204 may connect based on a location of the wireless communication device 204, and information indicating available frequencies in the second RAN via which frequencies the wireless communication device 204 is allowed to access a network being accessible by the mobility management node, said the mobility management node being operated by an operator different from those operating the first and second RANs.

Figure 7:
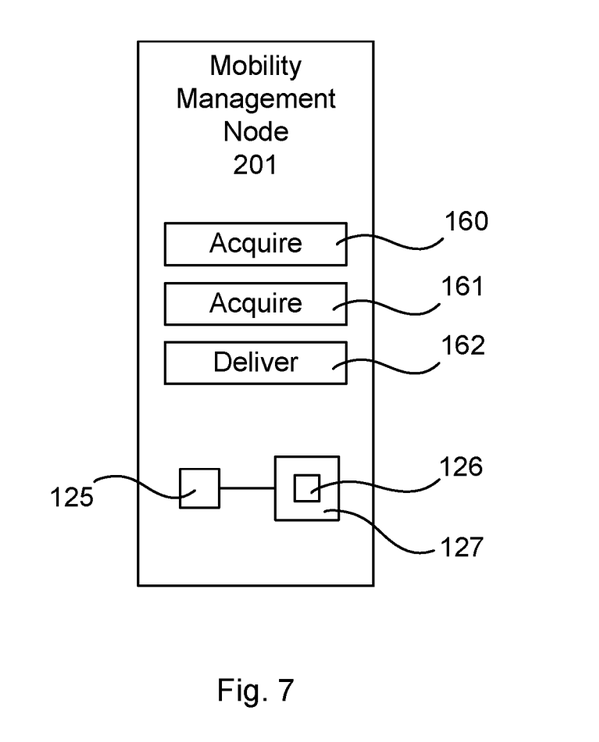
FIG. 7 illustrates a mobility management node according to an embodiment.

The means 140 and 141 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive. Further, the wireless communication device 204 may comprise detecting means for instance configured to detect when it is time to hand over to a RAN different from the RAN currently serving the wireless communication device 204, and measuring means configured to measure various network parameters and/or signal levels. FIG. 7 illustrates a mobility management node 201 according to an embodiment. The steps of the method performed by the mobility management node 201 in a core network of managing a plurality of non-coordinated RANs connected to the core network according to embodiments are in practice performed by a processing unit 125 embodied in the form of one or more microprocessors arranged to execute a computer program 126 downloaded to a suitable storage volatile medium 127 associated with the microprocessor, such as a RAM, or a non-volatile storage medium such as a Flash memory or a hard disk drive. The processing unit 125 is arranged to cause the mobility management node 201 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a DVD or a memory stick. As a further alternative, the computer program 126 may be downloaded to the storage medium 127 over a network. The processing unit 125 may alternatively be embodied in the form of a DSP, an ASIC, a FPGA, a CPLD, etc.

The mobility management node 201 comprises acquiring means 160 adapted to acquire information indicating that a wireless communication device is connected to a base station in a first of the plurality of RANs, and information indicating a location of the wireless communication device, acquiring means 161 adapted to acquire information identifying at least a second of the plurality of RANs to which the wireless communication device may connect based on the location of the wireless communication device, and information indicating available frequencies in the second RAN via which frequencies the wireless communication device is allowed to access a network being accessible by the mobility management node, said the mobility management node being operated by an operator different from those operating the first and second RANs, and delivering means 162 adapted to deliver the information identifying the second RAN and the information indicating available frequencies in the second RAN to the wireless communication device.

The mobility management node 201 may alternatively be implemented by a plurality of different nodes, or even by a cloud structure.

The means 160-162 may comprise communications interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Alternative arrangements are also possible. One example of such alternative arrangement is as following. The mobility management node 201 acquires information that the wireless communication device 204 is connected to a base station 202 in the first of the plurality of the RANs. The mobility management node 201 uses a further network node for acquiring information regarding the position of the wireless communication device (204). This further network node can for example be an Enhanced Serving Mobile Location Centre (E-SMLC, described in 3GPP TS 36.305).

The mobility management node 201 requests the further network node to perform positioning of the wireless communication device 204 and may also provide information of the first RAN to said further network node. The further network node performs positioning of the wireless communication device 204. The further network node acquires information identifying at least a second of the plurality of RANs to which the wireless communication device 204 may connect based on the location of the wireless communication device 204, and information indicating available frequencies in the second RAN via which frequencies the wireless communication device 204 is allowed to access a network 205 being accessible by the mobility management node 201, said the mobility management node 201 being operated by an operator different from those operating the first and second RANs. The further network node delivers the acquired information to the mobility management node 201. The mobility management node 201 delivers the information identifying the second RAN and the information indicating available frequencies in the second RAN to the wireless communication device 204.

The previously discussed DSO MNO DB 206 could be arranged either locally to or remote from said further network node.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a mobility management node in a core network of a Distributed Service Operator, DSO, comprising:
   managing connections of a plurality of wireless communication devices to a DSO network of the DSO via a plurality of non-coordinated radio access networks, RANs, connected to the core network of the DSO, wherein the plurality of non-coordinated RANs are managed by different Mobile Network Operators, MNOs, and managing the connections comprises:
   obtaining information indicating that a wireless communication device from among the plurality of wireless communication devices is connected to a first RAN of the plurality of non-coordinated RANs, the first RAN being managed by a first MNO;
   obtaining information indicating a location of the wireless communication device;
   obtaining information identifying at least a second RAN of the plurality of non-coordinated RANs to which the wireless communication device may connect based on the location of the wireless communication device, the second RAN being managed by a second MNO, which is different from the first MNO;
   obtaining information indicating available frequencies in the second RAN via which frequencies the wireless communication device is allowed to access the DSO network and
   delivering the information identifying the second RAN and the information indicating the available frequencies in the second RAN to the wireless communication device.

2. The method of claim 1, wherein:
   obtaining the information indicating that the wireless communication device is connected to the first RAN comprises receiving a RAN identifier from a base station of the first RAN to which the wireless communication device is connected; and
   obtaining the information indicating the location of the wireless communication device comprises determining the location of the wireless communication device based on the RAN identifier received from the base station of the first RAN.

3. The method of claim 1, wherein:
   obtaining the information indicating the location of the wireless communication device comprises receiving location data of the wireless communication device from a base station of the first RAN to which the wireless communication device is connected.

4. The method of claim 1, wherein obtaining the information identifying at least the second RAN of the plurality of RANs to which the wireless communication device may connect comprises:
sending a request for the information to an external information providing device, the request comprising the location information of the wireless communication device and an identifier of the first RAN; and
receiving, in response to the request, the information identifying said at least the second RAN of the plurality of RANs to which the wireless communication device may connect based on the location of the wireless communication device, and the information indicating the available frequencies in the second RAN.

5. A mobility management node for a core network of a Distributed Service Operator, DSO, comprising a processing unit and a memory, said memory containing instructions executable by said processing unit, whereby the mobility management node is operative to:
manage connections of a plurality of wireless communication devices to a DSO network of the DSO via a plurality of non-coordinated radio access networks, RANs, connected to the core network of the DSO, wherein the plurality of non-coordinated RANs are managed by different Mobile Network Operators, MNOs, and, in order to manage the connections, the mobility management node is further operative to:
obtain information indicating that a wireless communication device from among the plurality of wireless communication devices is connected to a first RAN of the plurality of non-coordinated RANs, the first RAN being managed by a first MNO;
obtain information indicating a location of the wireless communication device;
obtain information identifying at least a second RAN of the plurality of non-coordinated RANs to which the wireless communication device may connect based on the location of the wireless communication device, the second RAN being managed by a second MNO, which is different from the first MNO;
obtain information indicating available frequencies in the second RAN via which frequencies the wireless communication device is allowed to access the DSO network; and
deliver the information identifying the second RAN and the information indicating the available frequencies in the second RAN to the wireless communication device.

6. The mobility management node of claim 5, further being operative to:
when obtaining the information indicating that the wireless communication device is connected to the first RAN, receive from a base station of the first RAN to which the wireless communication device is connected; and
when obtaining the information indicating the location of the wireless communication device, determine the location of the wireless communication device based on the RAN identifier received from the base station of the first RAN.

7. The mobility management node of claim 5, further being operative to:
when obtaining the information indicating the location of the wireless communication device, receive location data of the wireless communication device from a base station of the first RAN to which the wireless communication device is connected.

8. The mobility management node of claim 5, further being operative to, when acquiring the information identifying at least the second RAN of the plurality of RANs to which the wireless communication device may connect:
send a request for the information to an external information providing device, the request comprising the location information of the wireless communication device and an identifier of the first RAN; and
receive, in response to the request, the information identifying said at least a second RAN of the plurality of RANs to which the wireless communication device may connect based on the location of the wireless communication device, and the information indicating available frequencies in the second RAN.

* * * * *